UNITED STATES PATENT OFFICE.

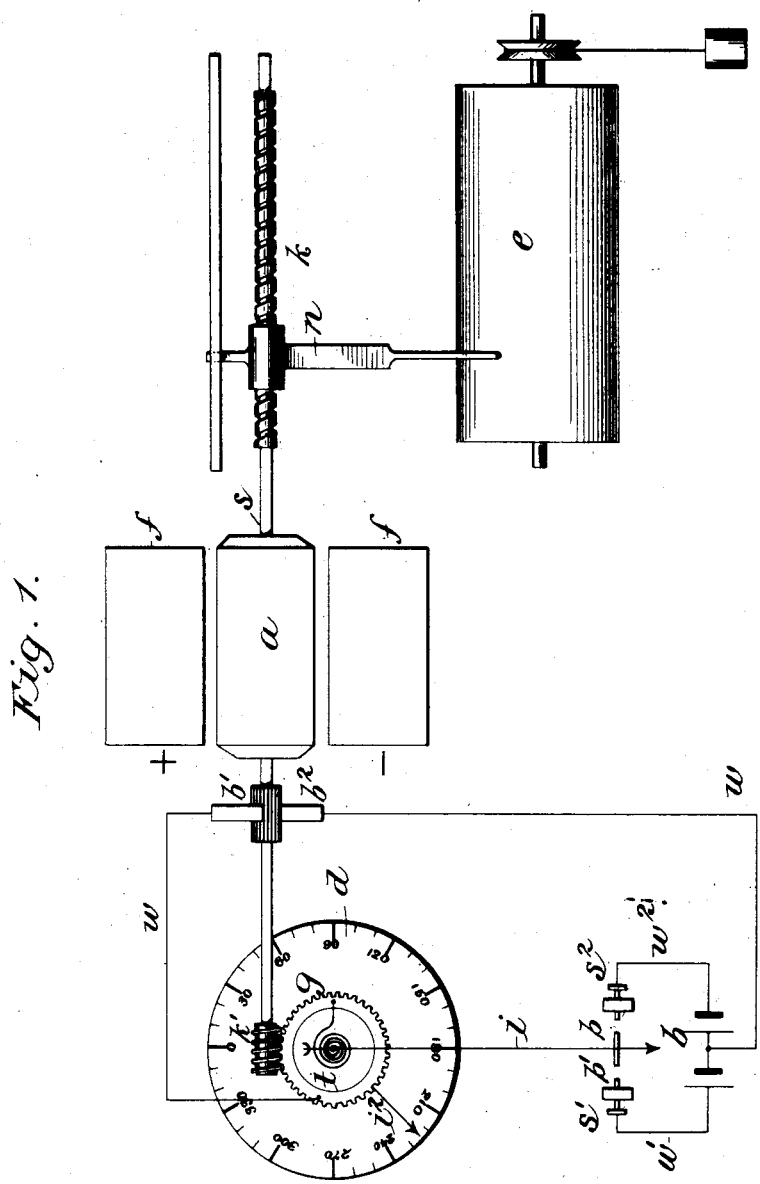

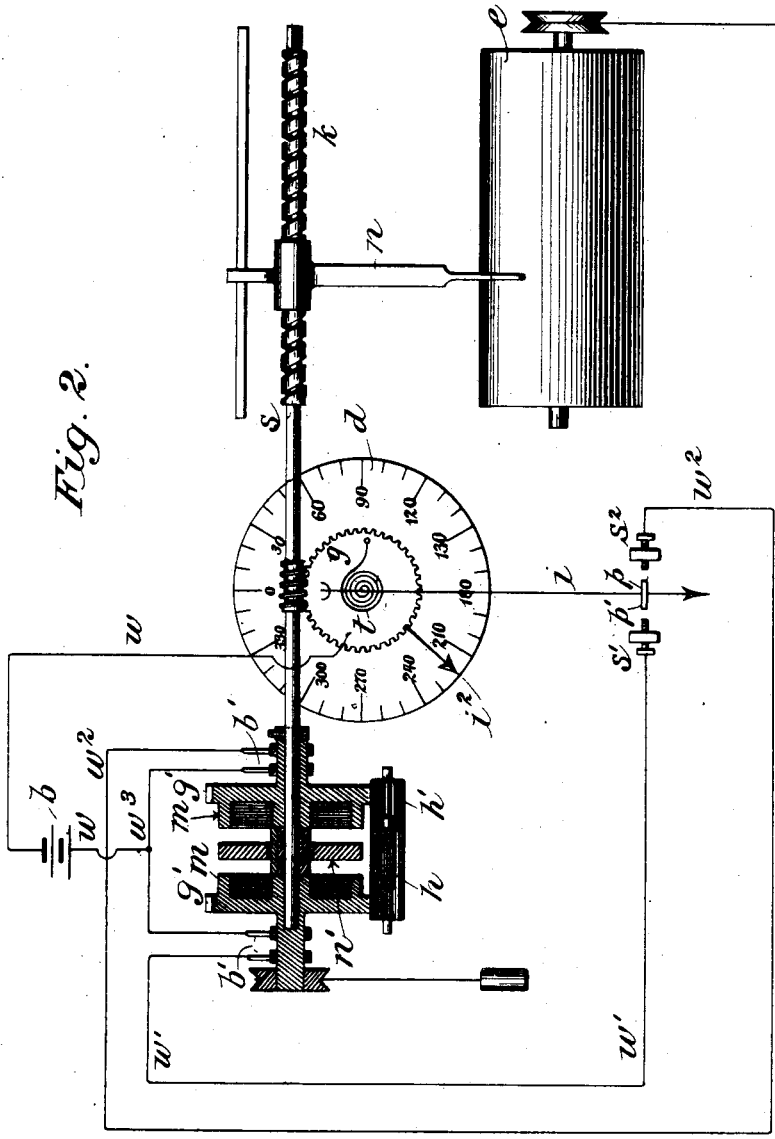

EDWARD WESTON, OF NEWARK, AND ADELBERT O. BENECKE, OF VAILSBURG, NEW JERSEY.

RECORDING ELECTRICAL MEASURING INSTRUMENT.

SPECIFICATION forming part of Letters Patent No. 713,259, dated November 11, 1902.

Application filed February 10, 1902. Serial No. 93,360. (No model.)

*To all whom it may concern:*

Be it known that we, EDWARD WESTON, a subject of the King of Great Britain, residing at Newark, and ADELBERT O. BENECKE, a subject of the Emperor of Germany, residing at Vailsburg, in the county of Essex and State of New Jersey, have made a new and useful Invention in Recording Electrical Measuring Instruments, of which the following is a specification.

Our invention has for its object to provide an electrically-controlled instrument adapted to be used with a measuring instrument, the movable part of which is controlled by a variable force, as the tension or torsion of a spring, and in such manner that the index-needle of the instrument shall always be caused to return to a definite starting-point, as the zero-point, after any change has been imparted to it by the force to be measured. Such instruments have a very extensive use in the arts in connection with instruments of precision—such as electrical measuring instruments, barometers, or instruments generally—the movable parts of which are controlled by the application of a continued torsional force and will be understood by referring to the accompanying drawings, in which—

Figure 1 is a diagrammatic view illustrating the essential features thereof, the controlling motive device being in this instance an electric motor; and Fig. 2 is a similar diagrammatic view in which the controlling motive device is a source of mechanically-applied power, the interconnecting gearing and means for connecting the same to the operative parts of the instrument being shown partly in sectional and partly in elevational view.

In another application filed by us in the United Patent Office of even date herewith and bearing Serial No. 93,359 we have disclosed an electrically-controlled recording instrument driven by an electric motor having a rotary armature operatively connected with a source of electrical energy or by a source of mechanically-applied power and in such manner that when any movement is imparted to the movable part of the instrument by the agent which controls its movements the motive device will cause the recording-stylus of a recording instrument operatively connected thereto to move in a definite direction and to make a permanent record both as to the nature and duration of such movements.

The present invention involves the use of such an apparatus in connection with a measuring instrument controlled in its movements by the tensional or torsional effects of a spring or equivalent variable force applied directly thereto and in such manner that when the index-needle or movable part has been moved from a normal or stated position it will be automatically returned to said normal position through the agency of the motive device which imparts motion to the recording-stylus or the recording instrument.

For a full and clear understanding of the invention, such as will enable others skilled in the art to construct and use the same, reference is had to the accompanying drawings, and first to Fig. 1, in which $a$ represents the armature and $ff$ the field-magnets of an electric motor. $k$ and $k'$ are worms or screws secured to the opposite ends of the armature-shaft $s$, and $n$ a recording arm or stylus provided with a pin or nut adapted to be moved back and forth by the worm or screw $k$. $e$ is a clock-driven cylinder upon which a record sheet or surface is placed. $b'$ $b^2$ are commutator-brushes connected by conductors $w$ to the worm-wheel $g$ and the middle of a battery or source of electrical energy $b$. $i$ is an index-needle carried by the movable part of a measuring instrument, the movements or variations of which it is desired to record upon the record sheet or surface carried by the cylinder $e$. $p$ $p'$ and $s'$ $s^2$ are electrical contacts, the contacts $s'$ $s^2$ being connected by conductors $w'$ $w^2$ to the opposite poles of the battery $b$.

The apparatus, as described thus far, is not substantially different from that disclosed in the before-mentioned application, except that in the instrument described in said application the contacts $s'$ $s^2$ are carried by arms secured to the worm-wheel $g$ and driven by the worm or screw $k'$, so that both sets of contacts $p$ $p'$ and $s'$ $s^2$ are movable. In the present invention, however, the contacts $s'$ $s^2$ are fixed or stationary, the contacts $p$ $p'$, carried by the index-needle $i$, alone being movable. The index-needle $i$ is controlled in its movements by any physical agent—as, for instance, the current-flow from a source of electrical energy through the movable coil of an electrical measuring instrument, $t$ being the usual spiral spring connected to the index-needle at one end and at the other to the worm-wheel $g$. $d$ is a stationary dial, and $i^2$ an independent index-needle carried by the worm-wheel $g$ for giving an additional indication of the torsional pull of the spring $t$ during the operation thereof, which will now be described. Suppose the index-needle $i$ of the measuring instrument to be pointing at a definite point upon the scale (not shown) when a definite flow of current is passing through the coil thereof and that under this condition of usage the movable contacts $p\ p'$ are located at equal distances from the stationary contacts $s^2\ s'$. Consequently the armature of the motor is stationary, and the stylus carried by the arm $n$ is marking a straight line upon the record sheet or surface in the direction of its movement. Suppose now an increase of current is caused to flow through the movable coil of the instrument in such manner as to cause the needle $i$ to move in the reverse direction of the hands of a watch, thus putting the spiral spring $t$ under further tension. The circuit will instantly be closed from the right-hand half of the battery $b$ by way of the conductor $w$, commutator-brush $b^2$, coils of the armature $a$, commutator-brush $b'$, conductor $w$, worm-wheel $g$, spiral spring $t$, index-needle $i$, contacts $p$ and $s^2$, conductor $w^2$ to the other pole of the battery, thereby causing the armature to rotate in such direction as to impart to the arm $n$ a movement from left to right, thus causing the stylus carried by said arm to place upon the record sheet or surface carried by the cylinder $e$ a definite record of the increased flow of current and at the same time causing the worm $k'$ to impart to the worm-wheel $g$ a motion in the direction of the hands of a watch, thereby putting the spiral spring $t$ under further tension until the index-needle $i$ appears in the central position shown, with the movable contacts $p$ and $p'$ out of electrical contact with the stationary contacts $s^2\ s'$. The index-needle $i^2$ will, it will be noted, give a direct visual indication of the amount of tension or torsion put upon the spring $t$. Any diminution of current-flow through the movable coil of the instrument will cause the index-needle $i$ to be rotated in a reverse direction under the influence of the spiral spring $t$ in such manner as to cause the circuit to pass from the left-hand half of the battery through the contacts $s'\ p'$ and coils of the armature $a$, the reversal of current thus effected causing said armature to rotate in a reverse direction, thus giving to the stylus carried by the arm $n$ a motion from right to left, so that a corresponding record is made upon the record sheet or surface carried on the cylinder $e$. At the same time motion is imparted to the worm-wheel $g$ by the worm or screw $k'$ in the reverse direction of the hands of a watch, thus putting the spring $t$ under reduced tension until the index-needle $i$ assumes its central position, as before, the index-needle $i^2$ in this instance giving a visual indication of the diminution of the tension or torsion put upon the spring $t$.

In Fig. 2 of the drawings we have shown how the same results are obtained with the same mechanism, in which, however, the controlling apparatus is a mechanically-impelled motive device. In this form of the apparatus the shaft $s$ is driven by a mechanical source of power, as a weight acting upon a pulley. $m\ m$ are electromagnetic clutches adapted to run loosely upon the driving-shaft $s$, said clutches being provided with the usual magnetizing-coils electrically connected with current-collecting rings and pairs of brushes $b'\ b'$, resting thereon, to conductors $w'\ w^2\ w^3$ and the positive pole of the battery $b$. The negative pole of the battery is connected by conductor $w$ to the worm-wheel $g$. Each of the magnetic clutches $m$ is provided with gear-teeth $g'\ g'$ at its outer circumference adapted to mesh, respectively, with pinions $h\ h'$, which in turn mesh with each other. $n'$ is a magnetizable disk loosely keyed to the shaft $s$ and adapted to be moved in either one direction or the other, according to which of the two clutches is magnetized. The other parts of the apparatus and circuit connections are not substantially different from the like parts disclosed in Fig. 1 of the drawings, except that the circuit connections are varied here to suit the conditions of the clutch mechanism and the application of power from a mechanically-applied source of energy, as a weight acting upon a pulley. The operation of this form will now be described. Suppose the index-needle $i$ to be moved in the direction of the hands of a watch, as before. The circuit will be instantly closed from the $+$ pole of the battery by conductor $w^3$, coils of the left-hand clutch $m$, brushes $b'$, conductor $w'$, contacts $s'\ p'$, index-needle $i$, coil-spring $t$, worm-wheel $g$, conductor $w$ to the negative pole. This causes the movable disk $n'$ to move into frictional contact with the face of the left-hand clutch $m$, thereby imparting motion to the shaft $s$ and to the worms $k$ and $k'$ in such direction as to cause the arm $n$ to move from left to right and the index-needle $i^2$ in the direction of the hands of a watch, thus increasing the tension upon the spring $t$ and causing the index-needle $i$ to ultimately interrupt the circuit between the contacts $p'$ and $s'$. Any reverse change in the current-flow through the controlling-coil will in like manner cause the index-needle $i$ to move in a reverse direction from that of the hands of a watch, closing the circuit between the contacts $p$ and $s^2$, so that now the current flows from the $+$ pole of the battery by the conductor $w^3$, coils of the right-hand clutch $m$, conductor $w^2$, contact $s^2$, contact $p$, index-needle $i$, spring $t$, worm-wheel $g$, conductor $w$, causing the disk $n'$ to be drawn to the right into frictional contact with the face of the right-hand clutch $m$, so that motion is imparted from the pulley by the clutch $m$ to the pinion $h$, pinion $h'$, clutch $m$ on the right to the shaft $s$ in a reverse direction, thereby causing the stylus carried by the arm $n$ to move to the left over the record surface or sheet and at the same time diminish the torsional pull upon the spring $t$ until the current is interrupted at the contacts $p$ and $s^2$ and the index-needle $i$ returned to its normal or starting position.

Our invention has, as before indicated, a wide application or use in the arts and has an especial utility in connection with electrical measuring instruments used to indicate the current-flow between a primary or generating source of electrical energy and a secondary or storage source, as a storage battery, the arrangement being such that a correct record can be at all times had of the current-flow through the measuring instrument correctly indicating the nature and duration thereof, whether the same be flowing from the generator to the battery or in a reverse direction from the battery, such a record being of great importance in connection with systems of electrical current-supply where storage batteries are charged. Although we have defined springs as the variable forces usually applied to such instruments, we may use any variable force in opposing the forces acting upon the movable part of the indicator—such, for instance, as a weight, gas, or air under pressure, &c.

Having thus described our invention, what we claim, and desire to secure by Letters Patent of the United States, is—

1. An instrument for recording the nature of physical changes, consisting of a movable agent or part controlled in its movements by the combined influence of such changes and one or more permanently-acting variable forces, as a spring or springs; a recording instrument and a motive device mechanically connected to the movable stylus of said instrument and to the spring or springs; together with a source of electrical energy and circuits and circuit connections between the motive device and the movable agent, whereby any variation of movement imparted to the movable agent is accurately recorded as to its nature and the variable force or forces correspondingly increased or decreased, substantially as described.

2. An instrument for recording the nature and duration of physical changes, consisting of a movable agent or part controlled in its movements by the combined influence of such changes and one or more permanently-acting variable forces, as a spring or springs; a power-impelled recording instrument and a motive device mechanically connected to the movable stylus of said instrument and to the spring or springs; in combination with a source of electrical energy and electrical connections between the same, the motive device and the movable part or agent, whereby any variation of movement imparted to the movable agent is accurately recorded as to its nature and duration and the variable force or forces correspondingly increased or decreased, substantially as described.

3. An instrument for recording the nature and duration of physical changes, consisting of a movable agent or part controlled in its movements by the combined influence of such changes and one or more permanently-acting variable forces, as a spring or springs; a power-impelled recording instrument and a motive device mechanically connected to the movable stylus of said instrument and to the spring or springs; in combination with a source of electrical energy and electrical connections between the same, the motive device and the movable part or agent; together with an indicating hand or needle operatively connected with the motive device, whereby any variation of movement imparted to the movable agent is accurately recorded as to its nature and duration, the variable force or forces correspondingly increased or decreased and an indication of such increase or decrease noted by the index-needle, substantially as described.

4. An indicating instrument for giving visual indications of physical changes in nature having a movable part controlled in its movements by the combined influence of such changes and one or more permanently-acting variable forces, as a spring or springs; in combination with a motive device and a source of electrical energy; together with electrical circuits, mechanical and electrical connections between the movable parts of the indicating instrument and of the motive device, whereby any variation of movement of the movable part of the indicating instrument will be copied by the movable part of the motive device as to range and direction and the variable forces correspondingly increased or decreased, substantially as described.

In testimony whereof we have signed our names to this specification in the presence of two subscribing witnesses.

EDWARD WESTON.
ADELBERT O. BENECKE.

Witnesses:
W. H. YAWGER,
C. J. KINTNER.